United States Patent [19]

Freeman

[11] 3,896,537
[45] July 29, 1975

[54] TOOL FOR INSTALLING RESILIENT RINGS ON CYLINDRICAL MEMBERS

[75] Inventor: William H. Freeman, Joliet, Ill.
[73] Assignee: Caterpillar Tractor Co., Peoria, Ill.
[22] Filed: Dec. 26, 1973
[21] Appl. No.: 428,091

[52] U.S. Cl. .................. 29/235; 29/450; 157/1.22
[51] Int. Cl.² ........................................ B23P 19/02
[58] Field of Search ............ 29/450, 235; 157/1.22, 157/1.24

[56] References Cited
UNITED STATES PATENTS

| | | | |
|---|---|---|---|
| 1,968,640 | 7/1934 | Elms | 29/235 |
| 2,437,512 | 3/1948 | Ekse | 157/1.24 |
| 2,845,969 | 8/1958 | Duquesne | 157/1.24 X |
| 3,037,549 | 6/1962 | Jacobson | 157/1.22 |
| 3,052,971 | 9/1962 | McBride | 29/450 UX |
| 3,177,569 | 4/1965 | Raney | 29/235 |
| 3,191,657 | 6/1965 | Lund | 157/1.24 |

Primary Examiner—Charlie T. Moon
Attorney, Agent, or Firm—Ralph E. Walters

[57] ABSTRACT

A tool for installing a resilient ring on a cylindrical member includes a tool body disposable endwardly against the cylindrical member, a cam member on the tool body having a cam surface engageable with a portion of the inner periphery of such a ring for positioning it peripherally outwardly of the cylindrical member, and a thrust member on the tool body being disposable in edgewardly peripherally overlapping relation to the cylindrical member for movement in an arcuate path upon rotation of the tool body in trailing relation to the cam surface for progressively sliding the portion of the ring peripherally onto the cylindrical member with a minimum of stretching and scuffing of the ring.

9 Claims, 5 Drawing Figures

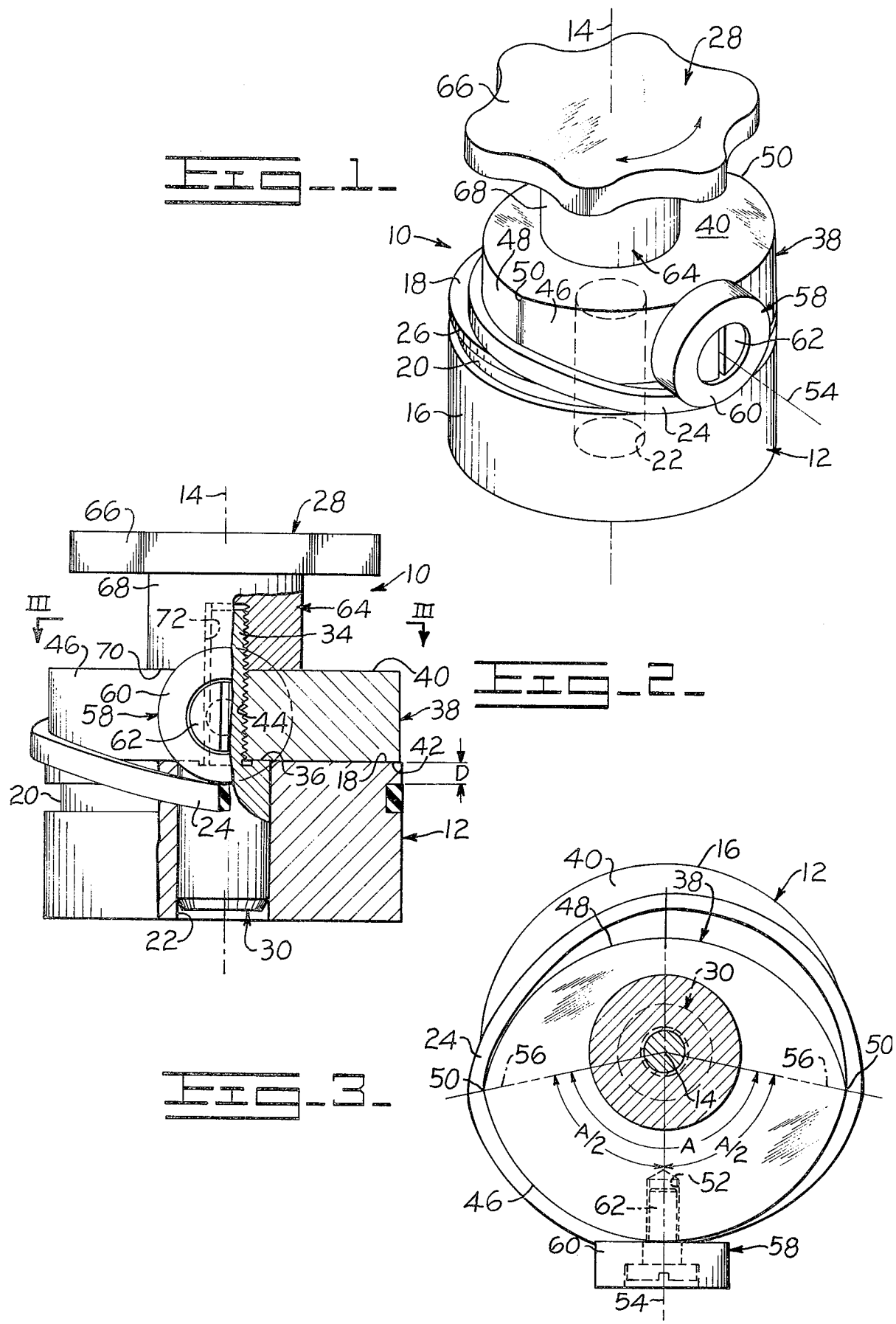

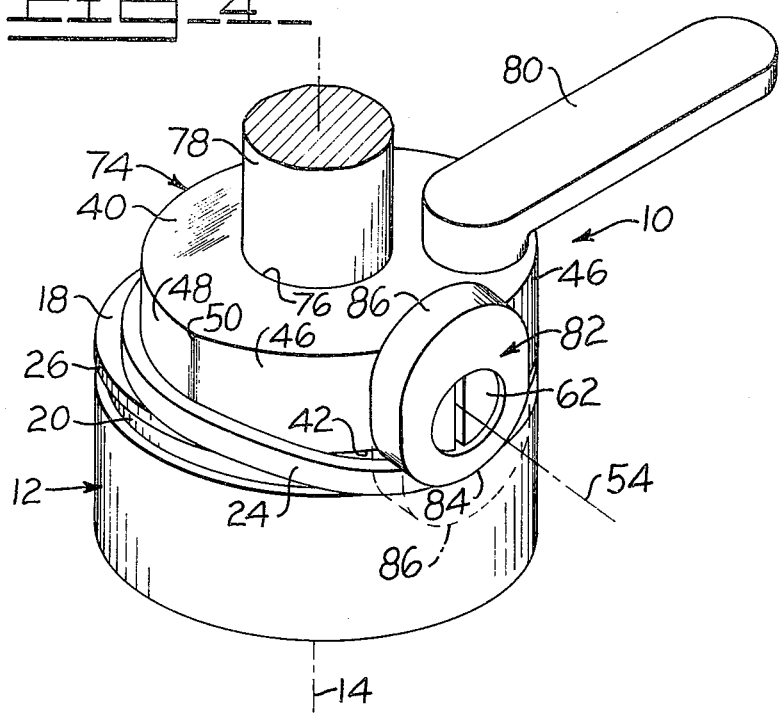
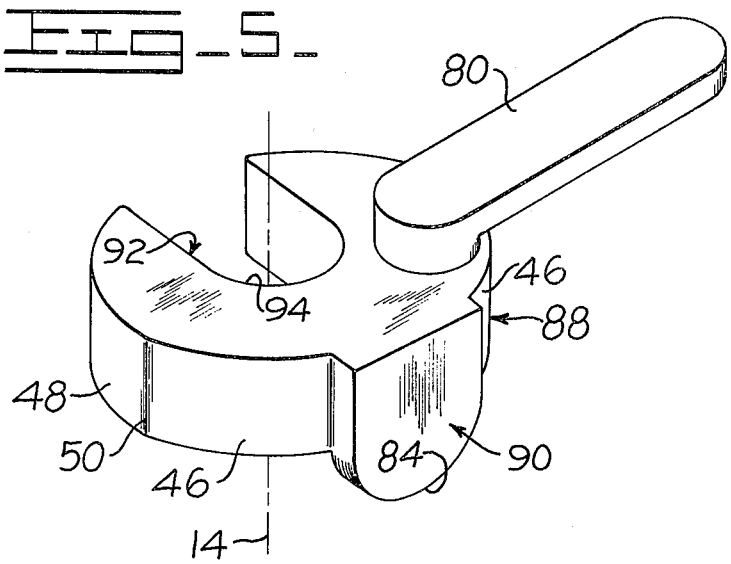

TOOL FOR INSTALLING RESILIENT RINGS ON CYLINDRICAL MEMBERS

BACKGROUND OF THE INVENTION

Installing a resilient ring on a cylinder has long been a problem since the relaxed ring is normally smaller than the diameter of the cylinder and it must be stretched over a relatively sharp circumferential edge. The manual installation of these rings requires excessive exertion and frequently results in painful bruises and even more serious injuries to the hands. Further, since this is such a vexatious job, the assembler resorts to using wedge or prying type devices such as a sharp screwdriver without realizing the damage being done to the ring. Many times the rings are overstretched or scuffed as a result of twisting the ring over the edge of the cylinder, which results in a decreased service life or premature failure thereof.

One method of installing such a ring involves a time-consuming press arrangement using a cone-shaped ramp and cooperating thrust member which bears on the ring and gradually increases its diameter as it is axially displaced over the edge of the cylinder. Unfortunately, such an operation requires a high assembly force and tends to overstretch the ring while presenting the possibility of continually scuffing the ring as it is moved along the conical ramp. Additionally, there is a tendency for the ring to roll about its circumferential axis, which could damage it.

Another method of installing such rings involves placing one side of the ring in a groove in the cylinder and holding it with a thumb, and using the cylindrical extension of a T-shaped tool pivoted on the cylinder's axis to sweep the ring axially over the cylinder's edge as the tool is rotated 360°. While this is a common technique, it is still hard on the hands and severe severer localized twisting of the rings over the sharp edge of the cylinder with accompanying possible damage thereto.

SUMMARY AND OBJECTS OF THE INVENTION

It is therefore an object of the present invention to provide an improved tool for installing a resilient ring on a cylindrical member.

Another object of the present invention is to provide an effective tool of the character described which minimizes stretching and scuffing of a resilient ring as it is installed edgewardly over a cylindrical member.

Another object of the present invention is to provide a tool for quickly and conveniently installing a resilient ring in a peripheral groove in such a cylindrical member which requires only a minimum of manual skill, dexterity and effort.

Other objects and advantages of the present invention will become more readily apparent upon reference to the accompanying drawings and the following description.

BRIEF DESCRIPTION OF THE DRAWINGS

FIG. 1 is a perspective of the tool of the present invention in operative relation upon a cylindrical member and showing a resilient ring disposed thereon in a preinstalled position.

FIG. 2 is a side elevation of the tool of the present invention with portions broken away for illustrative purposes.

FIG. 3 is a transverse section through the tool of the present invention taken along the line III—III in FIG. 2.

FIG. 4 is a perspective of an alternate embodiment of the tool of the present invention.

FIG. 5 is a perspective of a third embodiment of the tool of the present invention.

DESCRIPTION OF PREFERRED EMBODIMENT

With reference to FIGS. 1, 2, and 3 of the drawings, a resilient ring installation tool embodying the principles of the present invention is generally indicated by the reference numeral 10. As shown, the tool is adapted to be operatively disposed endwardly against a cylindrical member 12 in substantially coaxial relation therewith along a common longitudinal axis 14. The cylindrical member includes an external peripheral surface 16, an upper end surface 18, and a ring receiving peripheral groove 20, as well as a centrally disposed piloting bore 22. The installation tool of the present invention is adapted to effectively install a resilient ring 24, such as a Teflon seal ring or the like, over a relatively sharp circumferential edge 26 of the cylindrical member and position it within the peripheral groove without damage thereto.

As shown best in FIG. 2, the installation tool of the present invention includes a tool body 28 having a longitudinally extended centrally disposed pilot rod 30 providing a reduced diameter threaded extension 34, and an upwardly facing shoulder 36. The tool body also includes a cam member 38 having an upper end surface 40, a lower end surface 42, and a screw threaded bore 44. The bore screw threadably receives the threaded portion 34 of the pilot rod with the end surface 42 abutting the shoulder 36.

As best shown in FIG. 3, the external periphery of the cam member 38 is substantially elliptical and includes a cam surface 46 which is substantially of the same curvature and is aligned with a portion of the peripheral surface 16 of the cylindrical member 12. The cam member also includes an arcuate relief surface 48 which is relatively radially inwardly disposed with respect to the cylindrical surface 16 and which intersects the cam surface at substantially diametrically opposite, longitudinally oriented common borders 50. Further, the cam member has a screw threaded bore 52 arranged along a radial axis 54 which is perpendicular to the axis 14 and perpendicularly bisects the angle A formed between a pair of longitudinally arranged planes 56 passing through the central axis 14 and the common borders 50.

The installation tool 10 of the present invention further includes a thrust member 58 providing a roller 60 which is rotatable about the axis 54 on a combination screw threaded shaft and bearing member 62 engaged in the screw threaded bore 52 of the cam member 38. As best shown in FIG. 2, the lowermost portion of the roller 60 longitudinally inwardly coincides with the distance D between the peripheral groove 20 and the end surface 18 of the cylindrical member 12.

Above the cam member 38, the tool body 28 also includes a head portion 64 having a handle 66, a cylindrical post 68, a lower end surface 70, and a screw threaded bore 72 adapted to receive the screw threaded extension 34 of the pilot rod 30. When the head portion is screw threadably installed on the mounting member with the surface 70 in abutment with the surface 40 of the cam member, a substantially integrally associated tool body is formed.

DESCRIPTION OF ALTERNATE EMBODIMENT

An alternate embodiment of the installation tool 10 of the present invention is shown in FIG. 4 wherein the same reference numerals have been applied to components thereof which are identical to their counterparts in the preferred embodiment described above. This alternate embodiment provides a cam member 74 having an upper end surface 40, a lower end surface 42, and a peripheral cylindrical cam surface 46 and a relief surface 48 substantially identical to the tool of the preferred embodiment. However, in this embodiment the cam member 74 includes a centrally disposed bore 76 adapted to closely receive a cylinder rod 78 which is integrally associated with the cylindrical member 12.

The alternate embodiment of the tool may be rotated about the axis 14 by grasping a lever 80 integrally associated with the upper surface 40 of the cam member 74. Also, in this embodiment the combination screw threaded shaft and bearing member 62 secures a dual position thrust member 82 in an upward position as shown in solid lines or alternately in a downward position as shown in dashed lines. In this way an arcuate lower surface 84 serves to position the resilient ring 24 a predetermined longitudinal distance D from the upper end surface 18 of the cylindrical member 12. An upper surface 86 is provided which may be inverted to become downwardly depending by loosening of the screw threaded shaft and bearing member 62. In this manner, the tool is adaptable for installing rings on cylindrical members having a groove located a somewhat greater distance from the upper surface of the cylindrical member.

DESCRIPTION OF THIRD EMBODIMENT

As best shown in FIG. 5, the installation tool 10 of the present invention may also include a cam member 88 having an integrally associated thrust member 90 with an arcuate lower surface 84 substantially identical to that disclosed in FIG. 4. Like FIG. 4, the cam member 88 includes the cam surface 46, the arcuate relief surface 48, and the common borders 50 of the first embodiment, as well as the integrally associated lever 80 of the alternate embodiment.

In this third embodiment, however, the cam member 88 is provided with a radially outwardly opening slot 92 defining a semicylindrical internal surface 94 adapted to abut a cylinder rod 78 or the like in a manner comparable to the centrally disposed bore 76 shown in FIG. 4 for piloting purposes.

OPERATION

While the construction and operation of the above-described embodiments of the present invention are believed clearly apparent from the foregoing description, further amplification will subsequently be made in the following brief summary of such operation. With reference to FIGS. 1, 2 and 3, the resilient ring 24 is positioned transversely obliquely to the longitudinal axis 14 and edgewardly over the cylindrical member 12 so that the relaxed ring is resting partly on the upper end surface 18 and partly within the peripheral groove 20 of the cylindrical member. The installation tool 10 of the present invention is then axially alignably placed endwardly against the cylindrical member by inserting the pilot rod 30 thereof in the central bore 22 of the cylindrical member. Substantially simultaneously with this piloting and establishment of the common axis 14 between the tool and the cylindrical member, the thrust member 58 is disposed in edgewardly peripherally overlapping relation to the cylindrical member so that it is substantially circumferentially aligned with the lowermost part of the resilient ring adjacent its disposition in the groove. Thus, the upper surface of the ring is contacted by the roller 60, and the ring is trained diametrically oppositely thereof over the arcuate relief surface 48 of the cam member 38 and the upper end surface 18 of the cylindrical member 12 in pre-cam engaging and substantially relaxed condition. The ring is further initially positioned peripherally outwardly of the cylindrical member by the cam surface 46.

With the above-described relationship, rotation of the tool body 28 causes the cam surface 46 and its leading common borders 50 to initially impart substantially only a radially outward, progressively localized movement to the inner periphery of the ring. Simultaneously therewith the roller travels in an arcuate path in trailing relation to the common border or leading portion of the cam surface to impart substantially only an axially downward or progressively depressed localized movement to the ring. Such a combination of leading radial and trailing axial movement of the ring gradually increases the tension thereof and causes the ring to be drawn radially inward into the groove 20 in substantially circumferential coinciding relationship with respect to the position of the thrust member, and simultaneously slides the leading portion of the ring peripherally onto the cylindrical member.

Thus, substantially 360° rotation of the installation tool 10 of the present invention with respect to the cylindrical member 12 on which it is mounted installs the resilient ring 24 completely circumferentially within the groove 20, and it is noted that the tool may be rotated in either direction. This bidirectional ability is due to the symmetrically arcuate relationship of the common borders 50 from the thrust member 58 and minor axis of the elliptical tool body represented by the angles A/2 in FIG. 3. Also, the relatively free rotational movement of the roller 60 about the radial axis 54 and against the upper surface of the ring contributes to the relatively low effort required to rotate the installation tool of the present invention, while further reducing frictional contact between the tool and ring.

In the alternate embodiment of the installation tool 10 of the present invention shown in FIG. 4, the centrally disposed bore 76 within the cam member 74 pilotably maintains the tool and the cylindrical member 12 in common alignment on the axis 14 as the tool is rotated by grasping the radially outwardly extending lever 80. Additionally, the dual position thrust member 82 which peripherally overlaps the edge 26 of the cylindrical member may be rotated 180 degrees on the axis 54 by partially screw threadably disengaging the shaft and bearing member 62 to place the arcuate upper surface 86 in downwardly facing engagement with the resilient ring 24. It is relocked in place by tightening the screw. This results in further axially downward or depressing movement of the ring on the cylindrical member since the arcuate surface 86 is disposed at a radially greater distance than the arcuate surface 84 from the axis 54. Thus, the alternate embodiment is adaptable to install resilient rings at either of two downwardly disposed distances from the end surface 18 of the cylindrical member 12.

With reference to the third embodiment of the installation tool 10 of the present invention shown in FIG. 5, the semicylindrical recess 94 of the cam member 88 provides the same function as bore 76 of the above-described alternate embodiment, which is to align the tool axially with the cylindrical member. However, the slot 92 allows the tool to be radially positioned on the cylinder rod 78 or the like without the necessity of it being axially moved over a remote end thereof. This third embodiment also includes an integrally associated cam member 88 and thrust member 90 having a fixed arcuate lower surface 84. Such lower surface engages the upper portion of the resilient ring 24 during the ring installation process as in the other embodiments and in all other respects its mode of operation is identical to that described above.

It is therefore apparent that the installation tool of the present invention is better adapted to install a resilient ring edgewardly over and onto a cylindrical member. Not only is a ring installed on a cylindrical member with great speed and minimal manual effort, but also the usual scuffing and overstretching of it so common with prior art techniques are avoided.

While the invention has been described and shown with particular reference to the preferred and two alternate embodiments, it will be apparent that variations might be possible that would fall within the scope of the present invention, which is not intended to be limited except as defined in the following claims.

What is claimed is:

1. A tool, for installing resilient rings on cylindrical members, comprising;

a tool body disposable endwardly against such cylindrical member;

substantially elliptical cam means on said tool body including a cam surface engageable with a portion of the inner periphery of such ring for positioning said portion of the ring peripherally outwardly of said cylindrical member, and an arcuate relief surface forming a continuation of said cam surface to contain adjacent portions of the resilient ring in pre-cam engaging position endwardly against said cylindrical member in a substantially relaxed non-expanded condition; and axial thrust means on said tool body being disposable in edgewardly peripherally overlapping relation to said cylindrical member for movement in an arcuate path upon rotation of said tool body in trailing relation to said cam surface for progressively depressably sliding said portion of the ring peripherally onto said cylindrical member with a minimum of stretching and scuffing of the ring.

2. The tool of claim 1 wherein said tool body includes piloting means operably engageable with said cylindrical member to maintain said tool body and cylindrical member in substantially precise coaxial relation during rotation therebetween.

3. The tool of claim 2 wherein said arcuate relief surface and said cam surface are symmetrically arranged with respect to a substantially upright plane disposed along the minor axis of said tool body, and said thrust means is symmetrically oriented on said plane so that the tool is effective to install the resilient ring on said cylindrical member in either direction of rotation of the tool.

4. The tool of claim 3 wherein said thrust means is a roller mounted on said body for rotation about an axis substantially perpendicular to the axis of rotation of said tool body for rollably depressing the resilient ring edgewardly onto said cylindrical member.

5. The tool of claim 3 wherein said thrust means is a thrust member in substantially axial depressing engagement with the ring, and wherein said thrust member may be adjustably positioned to install the ring at selected axial distances peripherally onto said cylindrical member.

6. The tool of claim 4 including a handle portion radially outwardly extended from said tool body for allowing the tool to be manually rotated with respect to said cylindrical member.

7. The tool of claim 4 wherein said cylindrical member includes a central bore, and said piloting means is a piloting rod on said tool body adapted slidably to fit within said bore.

8. The tool of claim 6 wherein said cylindrical member includes an integrally associated upstanding post, and said piloting means includes an opening in said tool body adapted slidably to receive said post.

9. A tool, for installing a resilient seal ring within a peripheral groove in a cylindrical member, comprising;

a tool body endwardly positionable against such cylindrical member;

a cam surface on said tool body engageable with a portion of the inner periphery of such seal ring for positioning said portion of said seal ring peripherally outwardly of said cylindrical member;

an arcuate relief surface on said tool body forming a continuation of said cam surface to contain an adjacent portion of said seal ring in a pre-cam engaging position endwardly against said cylindrical member in a substantially relaxed nonexpanded condition; and a thrust member on said tool body in edgewardly peripherally overlapping relation to said cylindrical member for movement in an arcuate path upon rotation of said tool body in trailing relation to said cam surface for progressively depressably sliding said portion of said seal ring peripherally onto said cylindrical member and for guiding a trailing portion of said seal ring into said peripheral groove.

* * * * *